United States Patent
Yuen et al.

(10) Patent No.: US 11,435,896 B1
(45) Date of Patent: Sep. 6, 2022

(54) SECURED OPERATION WITH OPTIONAL CANCELLATION ON TOUCH-SENSITIVE DEVICES

(71) Applicant: TFI Digital Media Limited, Hong Kong (HK)

(72) Inventors: Yiu Fai Yuen, Hong Kong (HK); Andy Chang, Hong Kong (HK); Chi Keung Fong, Hong Kong (HK); Ka Hei Lai, Hong Kong (HK)

(73) Assignee: TFI Digital Media Limited, Hong Kong (HK)

( * ) Notice: Subject to any disclaimer, the term of this patent is extended or adjusted under 35 U.S.C. 154(b) by 12 days.

(21) Appl. No.: 17/180,872

(22) Filed: Feb. 22, 2021

(51) Int. Cl.
| | |
|---|---|
| *G06F 3/048* | (2013.01) |
| *G06F 3/04883* | (2022.01) |
| *G06F 3/0485* | (2022.01) |
| *G06F 1/03* | (2006.01) |
| *G06F 3/16* | (2006.01) |
| *G06F 3/01* | (2006.01) |

(52) U.S. Cl.
CPC ............ *G06F 3/04883* (2013.01); *G06F 1/03* (2013.01); *G06F 3/017* (2013.01); *G06F 3/0485* (2013.01); *G06F 3/16* (2013.01)

(58) Field of Classification Search
None
See application file for complete search history.

(56) References Cited

U.S. PATENT DOCUMENTS

| | | | |
|---|---|---|---|
| 2014/0071060 A1* | 3/2014 | Santos-Gomez | ..... G06F 3/0488 345/173 |
| 2014/0177396 A1* | 6/2014 | Lee | ..................... G06F 3/04886 368/10 |

* cited by examiner

*Primary Examiner* — Tuan S Nguyen
(74) *Attorney, Agent, or Firm* — Idea Intellectual Limited; Margaret A. Burke; Sam T. Yip

(57) ABSTRACT

The present invention provides a method and a device for facilitating a single touch-and-drag operation for a user to communicate his/her intention and make selection during a transaction flow in a robust and intuitive way. It can not only prevent erroneous selection triggered by any inadvertent or accidental touch but also provide option for the user to withdraw selection which is made unintentionally.

18 Claims, 5 Drawing Sheets

SECURED OPERATION WITH OPTIONAL CANCELLATION ON TOUCH-SENSITIVE DEVICES

FIELD OF THE INVENTION

The present invention generally relates to facilitating intuitive and secured operation via an interactive interface. More specifically, the present invention relates to techniques of facilitating single touch-and-drag operation via mobile devices with touch-sensitive screens.

BACKGROUND OF THE INVENTION

Mobile devices with touch-sensitive screens have been widely used for online transactions. As screens of mobile devices are usually small in size which result in smaller buttons or links in close proximity to each other, it might be difficult for a user to proceed with a transaction flow with his/her mobile phone in some situations. For example, when the user is moving or being distracted, he/she may inadvertently or accidentally touch an icon or button on the screen to cause erroneous selection. It is therefore desired to have a user interface that allows a user to communicate his/her intention and make selection on a touch-sensitive screen of a mobile device in a more secured and intuitive way.

SUMMARY OF THE INVENTION

One objective of the present invention is to improve the touch-sensing functionality of a touch-sensitive screen of a mobile device by facilitating a single touch-and-drag operation for a user to communicate his/her intention and make selection during a transaction flow in a robust and intuitive way. It can not only prevent erroneous selection (e.g. triggered by any inadvertent or accidental touch) in online transactions but also provide option for the user to withdraw selection which is made unintentionally.

In accordance with various embodiments, a method is provided for facilitating a single touch-and-drag operation in a mobile device having a touch-sensitive screen, the method comprises: setting the device to a standby state and displaying a user interface including one or more activating regions on the touch-sensitive screen; when a touch is determined to be received in the activating region, setting the mobile device to an introduction state configured to be expired in an introduction time duration; starting a first timer to count down from the introduction time and displaying timing information of the first timer on the touch-sensitive screen for indicating progress of the introduction state; when the introduction state is expired, setting the mobile device to a confirmation state if the touch received in the activating region is not released, wherein the confirmation state is configured to be expired in a confirmation time duration; starting a second timer configured to count down from the confirmation time duration; setting the mobile device to enter an execution state to execute an application process corresponding to the activating region or transmit a command to a remote server to execute a remote application process corresponding to the activating region if the touch received in the activating region is released from the activating region before the confirmation state being expired.

The method further comprises resetting the device to the standby state if the touch received in the activating region is released during the introduction state; if the touch received in the activating region is not released until the confirmation state is expired; or if the touch received in the activating region is dragged away from activating region during the confirmation state.

BRIEF DESCRIPTION OF THE DRAWINGS

Embodiments of the invention are described in more detail hereinafter with reference to the drawings, in which.

DETAILED DESCRIPTION

In the following description, methods for facilitating a user to perform a single touch-and-drag operation to initiate and confirm execution of an application process and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

Figure 1:
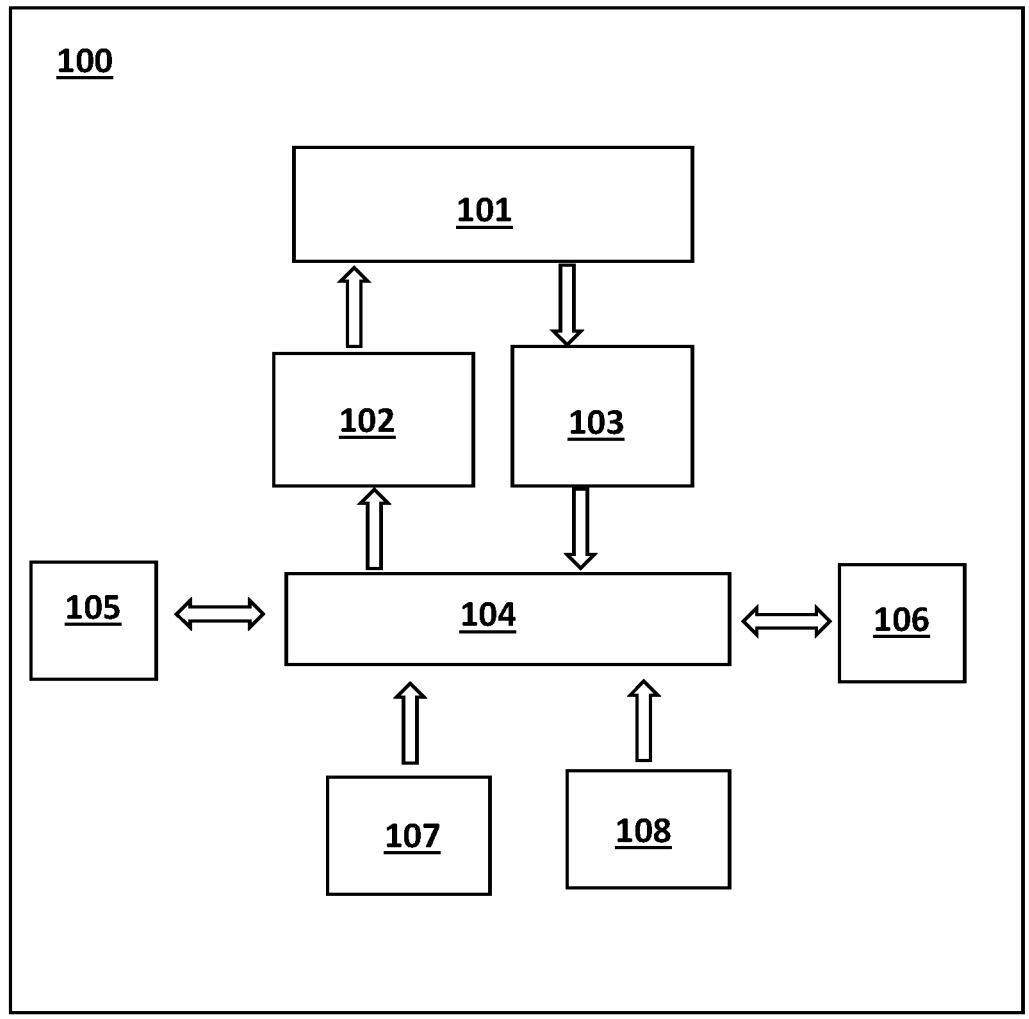
FIG. 1 depicts a schematic block diagram of a mobile device for facilitating a user to perform a single touch-and-drag operation in accordance with one embodiment of the present invention.

In accordance with various embodiments, the method may be implemented with a mobile device having touch-sensitive functionality. FIG. 1 depicts a schematic block diagram of a mobile device 100 for facilitating a user to perform single touch-and-drag operation in accordance with one embodiment of the present invention. The mobile device may comprise a touch-sensitive screen 101, a display driver 102, a touch-sensing controller 103, a processor 104, a memory 105, a communication module 106. Optionally, the mobile device may further comprise an acceleration sensing module 107 and a voice receiving module 108.

The touch-sensitive screen 101 be configured to display a user interface including one or more activating regions to facilitate user input and selections, to sense input touch gestures, including but not limited to tap, dragging upward/downward or leftward/rightward, on the screen and to generate touch-sensing signals.

The touch-sensing controller 102 may be connected to the touch-sensitive screen 101 and configured to receive the touch-sensing signals from the touch-sensitive screen 101 to generate touch data.

The display driver 103 may be connected to the touch-sensitive screen 101 and configured to drive the touch-sensitive screen 101 to display the user interface.

The processor 104 may be connected to the touch-sensing controller 102 and the display driver 103, and configured to receive the touch data from the touch-sensing controller 102, to analyze touch data for identifying a user input, to execute an application process in response to the identified user input, to generate display data for the display driver 103 to reconfigure the user interface being displayed in the touch-sensitive screen 101.

The memory 105 may be connected to the processor 104 and configured to store one or more touch-sensing parameters or predetermined instructions for execution of the application process.

The communication module 106 may be connected to the processor 104, and configured to transmit the identified user inputs to a remote processor (not shown), e.g. a cloud server, to execute a remote application process.

The acceleration sensing module 107 may be connected to the processor 104 and configured to measure acceleration of the mobile device and generate acceleration signals. The processor 104 may be further configured to receive the generated acceleration signals and determine whether there is a sudden motion of the mobile device.

The voice receiving module 108 may be connected to the processor 104 and configured to receive voice of a user and generate voice signals. The processor 104 may be further configured to receive the generated voice signals and identify whether the voice belongs to the user of the mobile device.

Figure 2:
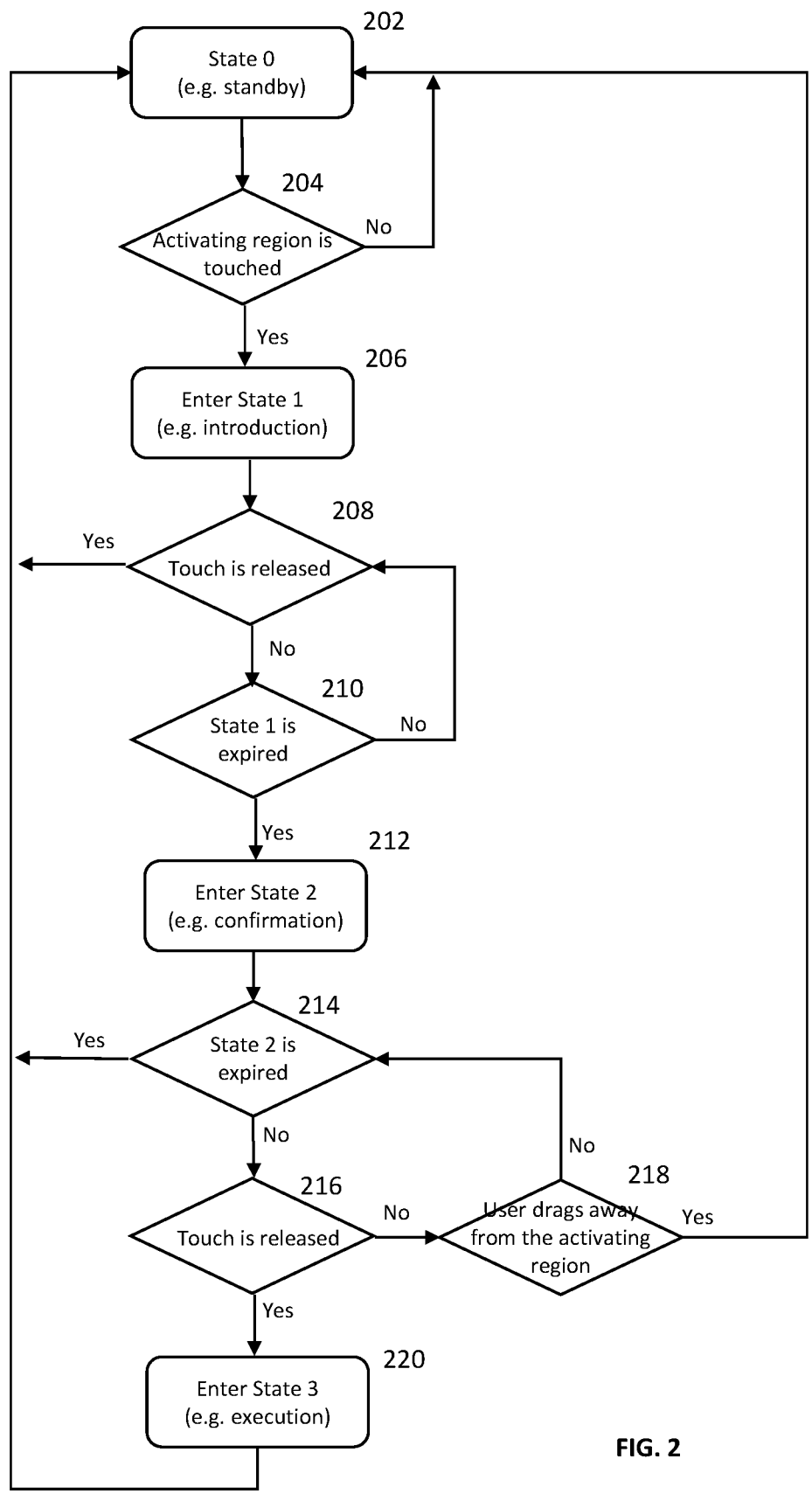
FIG. 2 depicts a flowchart of a method for facilitating a user to perform a single touch-and-drag operation according to one embodiment of the present invention.

FIG. 2 depicts a flowchart of a method for facilitating a single touch-and-drag operation according to one embodiment of the present invention. The single touch-and-drag operation may be applied in applications such as on-line shopping or payment transactions. The method may comprise:

step 202: setting a mobile device to enter a standby state (State 0) and displaying a user interface including one or more activating regions on a touch-sensitive screen of the mobile device;

step 204: determining whether a touch is received in an activating region of the displayed user interface, going to step 206 if a touch is detected, going to step 202 if no touch is detected;

step 206: setting the mobile device to enter an introduction state (State 1) configured to be expired in an (introduction) time duration, starting a first timer to count down from; optionally displaying timing information of the first timer on the touch-sensitive screen for indicating the progress of State 1;

step 208: determining whether the touch received in the activating region is released, going to step 210 if the touch is not released, going to step 202 if the detected touch is released;

step 210: determining whether State 1 is expired; going to step 212 if State 1 is expired, going to step 208 if State 1 is not completed;

step 212: setting the mobile device to enter a confirmation state (State 2) configured to be expired in a (confirmation) time duration, starting a second timer configured to counting down from;

step 214: determining whether State 2 is expired; going to step 202 if State 2 is expired, going to step 216 if State 2 is not expired;

step 216: determining whether the touch received in the activating region is released, going to step 220 if the touch is released, going to step 218 if the detected touch is not released;

step 218: determining whether the touch received in the activating region is dragged away from the activating region, going to step 214 if the touch is not dragged away from the activating region, going to step 202 if the detected touch is dragged away from the activating region;

step 220: setting the mobile device to enter an execution state (State 3) to execute an application process corresponding to the activating region or transmit a command to a remote server to execute a remote application process corresponding to the activating region; resetting the mobile device to State 0 after the application process is executed.

Figure 3:
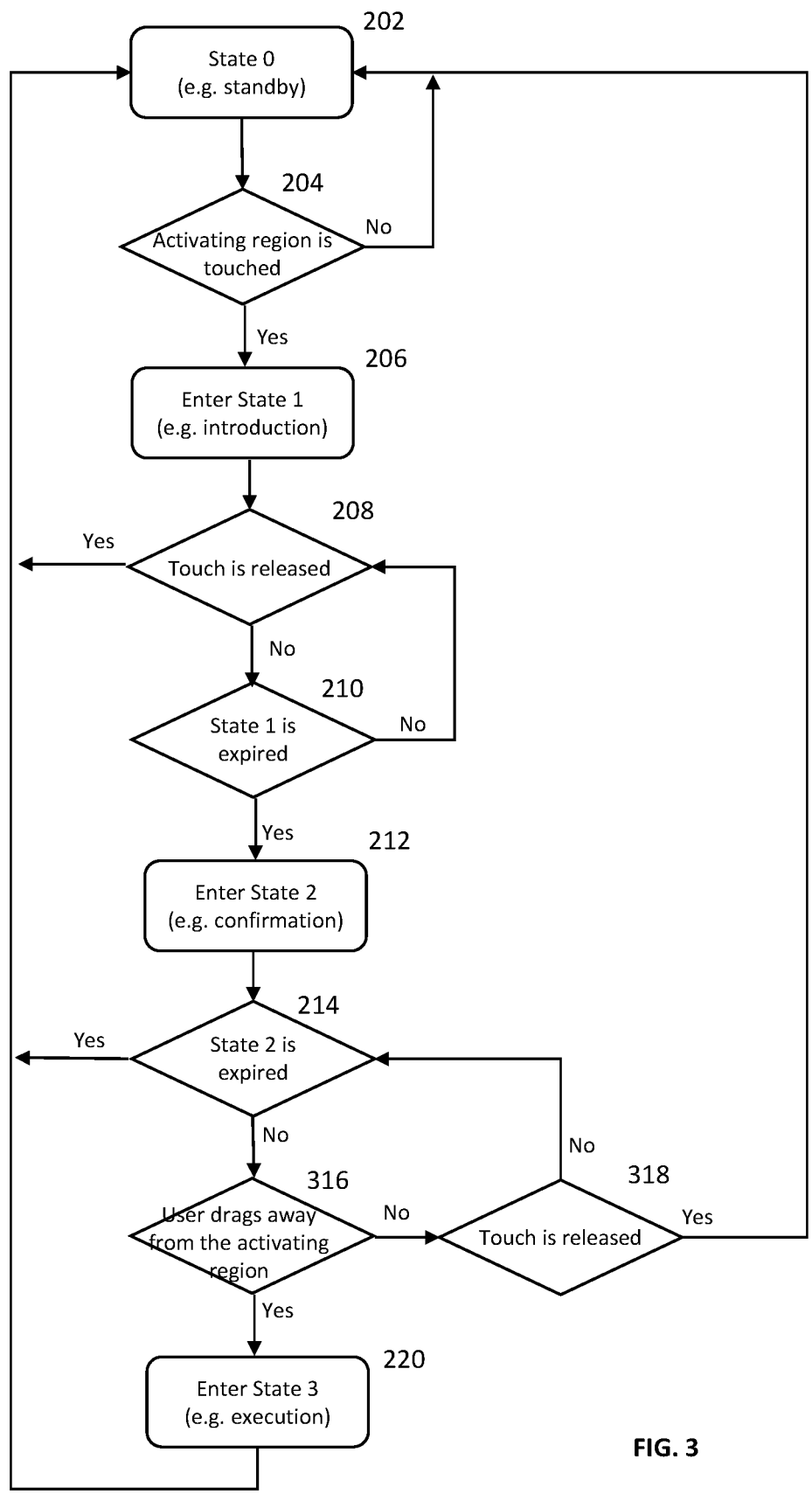
FIG. 3 depicts a flowchart of a method for facilitating a user to perform a single touch-and-drag operation according to another embodiment of the present invention.

FIG. 3 depicts a flowchart of a method for facilitating a user to perform a single touch-and-drag operation according to another embodiment of the present invention. This embodiment is different from the embodiment of FIG. 2 in that step 216 is changed to a step 316: determining whether the touch received in the activating region is released, going to step 220 if the touch is released, going to step 318 if the detected touch is not releases; and step 218 is changed to step 318: determining whether the touch received in the activating region is released from the activating region, going to step 214 if the touch is not dragged away from the activating region, going to step 202 if the detected touch is dragged away from the activating region.

It should be understood by those skilled in the art that the context of the touching and dragging can be specific to the user and/or the page displayed on the screen. Thus, when one user is logged onto and/or using the mobile device, one set of touch-sensing parameters or predetermined instructions can be used and when another user is logged onto and/or using the device another set of touch-sensing parameters or predetermined instructions can be used.

It should also be understood by those skilled in the art that a touch and/or drag action can be implemented in various ways to accomplish different results. For example, the touch can be a conventional touch where the user contacts a touch-sensitive screen with a finger, typically a fingertip, a shake, displacement, acceleration, orientation, roll, pitch, yaw, or movement of the user device or other suitable means of input that enables a touch to be detected.

According to various embodiments, before entering the standby state, the device may be configured to determine the identity of the user via the login or authentication process or via biometrics such as voice recognition, face recognition, fingerprint recognition, gesture recognition, and/or the like.

The introduction time duration and confirmation time duration may be dependent upon characteristics of the user, such as purchase history, activity history with the service or payment provider, age of the user account with the payment provider, gender, age of the user, time, location, browsing history, and the like.

In one embodiment, the method may further comprise matching the selected product to a database of purchasing record of the user and determining whether the user has purchased the selected product before; and adjusting the introduction time duration to a shorter period if the user has purchased the selected product before. Alternatively, the mobile device may be set to enter the confirmation state without entering the introduction state if the user has purchased the selected product before.

In one embodiment, the method may further comprise storing a lookup table of a list of age ranges and corresponding confirmation time duration values; searching an age range in which the identified user belongs to; and setting the confirmation time duration to a confirmation time duration value corresponding to the searched age range in the lookup table.

According to various embodiments, during the introduction state, the device may be configured to detecting whether the user is distracted by any events or accidents for preventing erroneous selection triggered by any inadvertent or accidental touch.

Figure 4:
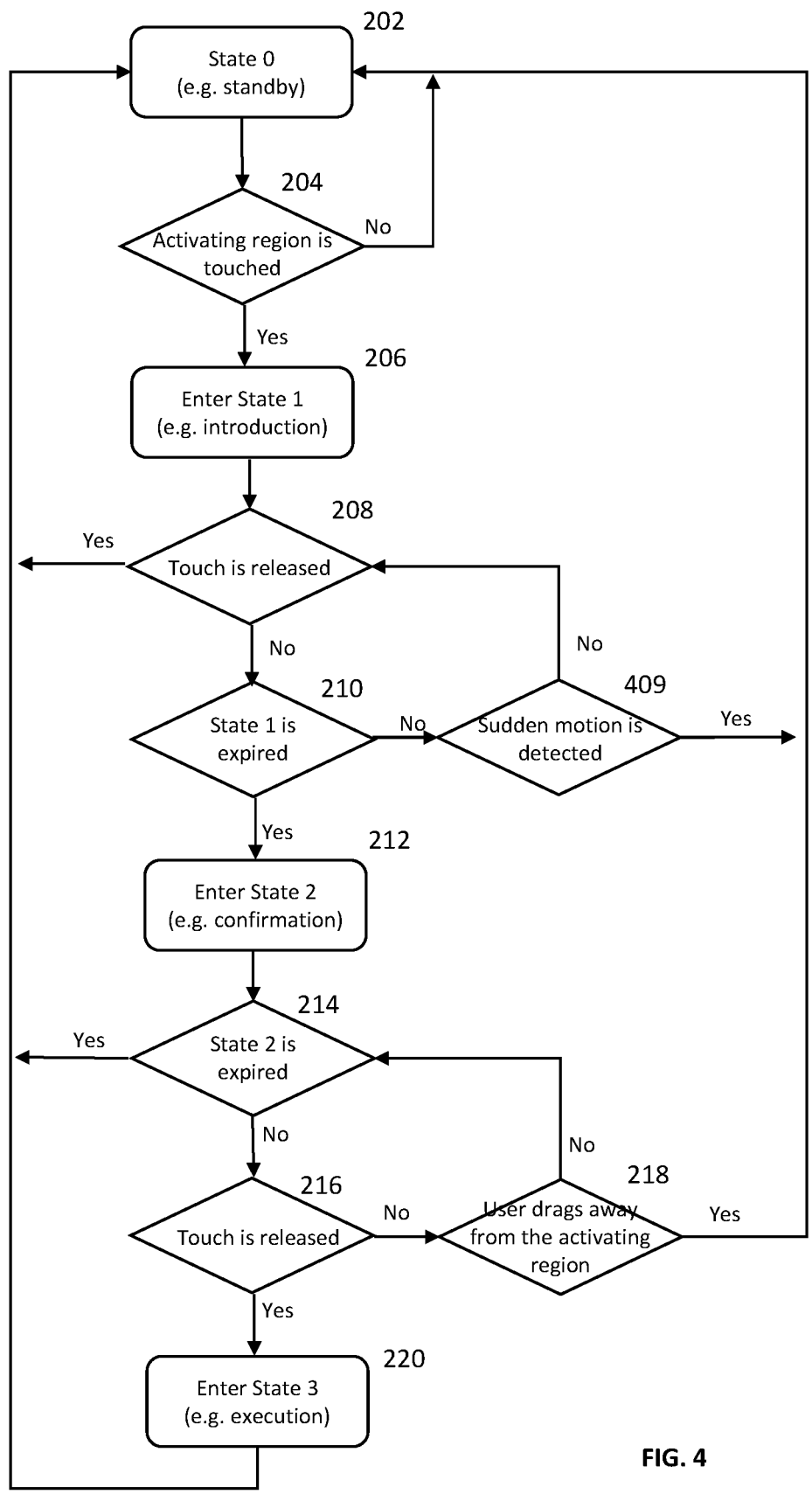
FIG. 4 depicts a flowchart of a method for facilitating a user to perform a single touch-and-drag operation according to another embodiment of the present invention.

FIG. 4 depicts a flowchart of a method for facilitating a user to perform a single touch-and-drag operation according to another embodiment of the present invention. This embodiment is different from the embodiment of FIG. 2 in that the method may further comprise, between step 208 and step 210, a step 409: sensing acceleration of the mobile device and determining whether the mobile device has a sudden motion; going to step 202 if a sudden motion is detected, going to step 208 if no sudden motion is detected.

Accordingly, step 210 is changed to: determining whether State 1 is expired; going to step 212 if State 1 is expired, going to step 409 if State 1 is not expired.

Figure 5:
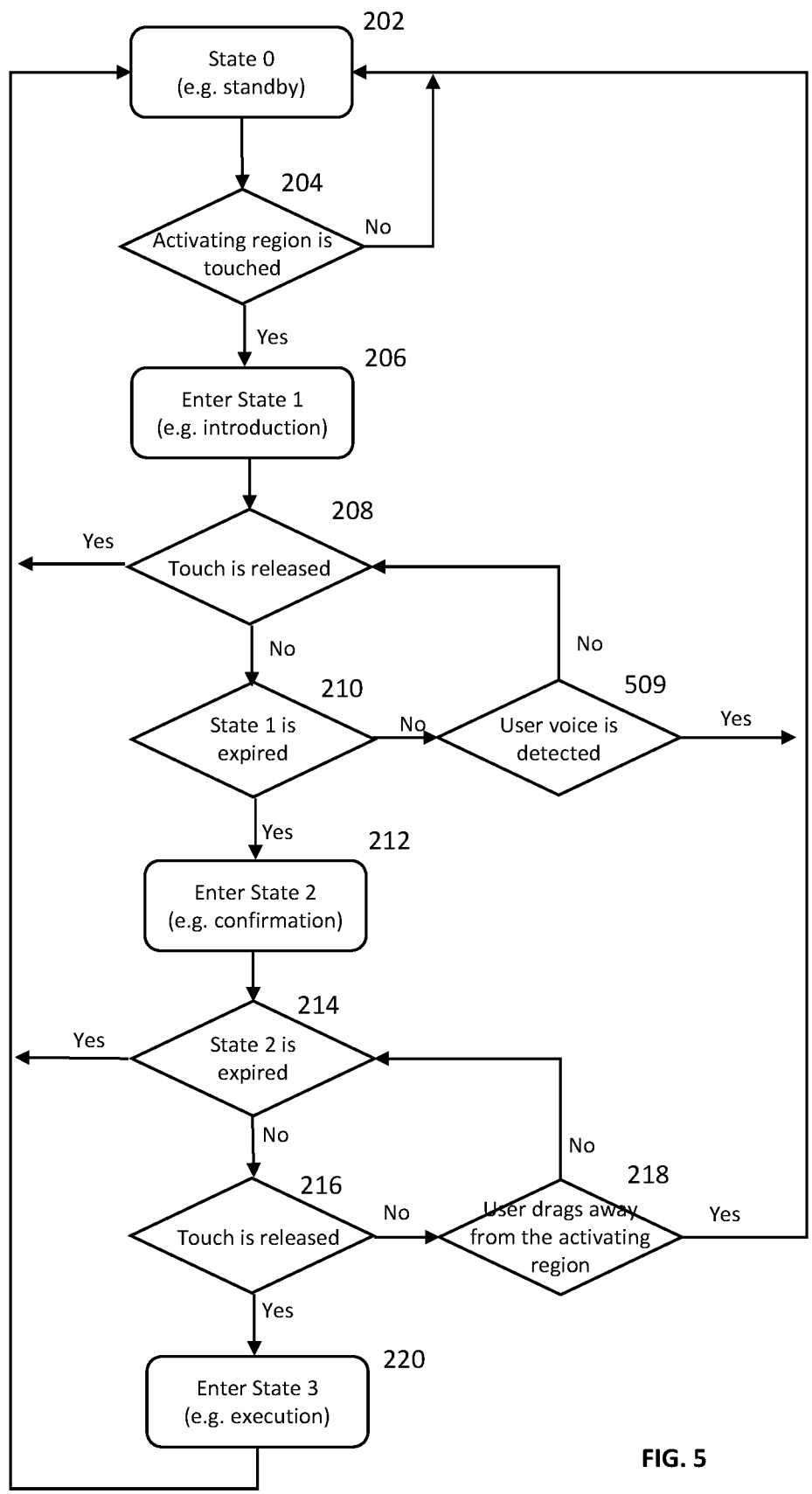
FIG. 5 depicts a flowchart of a method for facilitating a user to perform a single touch-and-drag operation according to another embodiment of the present invention.

FIG. 5 depicts a flowchart of a method for facilitating a user to perform a single touch-and-drag operation according to another embodiment of the present invention. This embodiment is different from the embodiment of FIG. 2 in that the method may further comprise, between step 208 and step 210, a step 509: detecting voice of a user of the mobile device; going to step 202 if the voice of the user is detected, going to step 208 if no sudden motion is detected. Accordingly, step 210 is changed to: determining whether State 1 is expired; going to step 212 if State 1 is expired, going to step 509 if State 1 is not expired.

In the case that the single touch-and-drag operation is applied in an on-line shopping transaction, at the standby state, a user interface such as a home page for an on-line shop or service provider may be displayed on a touch-sensitive screen of the mobile phone. The activating regions may be manifested as buttons, icons, product images, product names or other suitable indicative means that enables a user to make selection to purchase a product from the on-line shop or service provider.

At the introduction state, a plurality of contents in relation to the selected product may be displayed on the touch-sensitive screen. The plurality of contents in relation to the selected product may be displayed sequentially as a video clip or slide show providing additional details of the product.

At the confirmation state, a request may be displayed on the touch-sensitive screen to ask the user to confirm if he/she wants to proceed with purchasing the selected product by releasing his/her touch away from the activating region.

The embodiments disclosed herein may be implemented using mobile devices, computer processors, or electronic circuitries including but not limited to application specific integrated circuits (ASIC), field programmable gate arrays (FPGA), and other programmable logic devices configured or programmed according to the teachings of the present disclosure. Computer instructions or software codes running in the mobile devices, computer processors, or programmable logic devices can readily be prepared by practitioners skilled in the software or electronic art based on the teachings of the present disclosure.

All or portions of the electronic embodiments may be executed in one or more mobile devices including server computers, personal computers, laptop computers, mobile devices such as smartphones and tablet computers.

The electronic embodiments include computer storage media having computer instructions or software codes stored therein which can be used to program computers or microprocessors to perform any of the processes of the present invention. The storage media can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

Various embodiments of the present invention also may be implemented in distributed computing environments and/or Cloud computing environments, wherein the whole or portions of machine instructions are executed in distributed fashion by one or more processing devices interconnected by a communication network, such as an intranet, Wide Area Network (WAN), Local Area Network (LAN), the Internet, and other forms of data transmission medium.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. A method for facilitating a single touch-and-drag operation in a mobile device having a touch-sensitive screen, the method comprising:
   setting the device to a standby state and displaying a user interface including one or more activating regions on the touch-sensitive screen;
   when a touch is determined to be received in the activating region, setting the mobile device to an introduction state configured to be expired in an introduction time duration;
   starting a first timer to count down from the introduction time and displaying timing information of the first timer on the touch-sensitive screen for indicating progress of the introduction state;
   when the introduction state is expired, setting the mobile device to a confirmation state when the touch received in the activating region is not released, wherein the confirmation state is configured to be expired in a confirmation time duration;
   starting a second timer configured to count down from the confirmation time duration; and
   setting the mobile device to enter an execution state to execute an application process corresponding to the activating region or transmit a command to a remote server to execute a remote application process corresponding to the activating region when the touch received in the activating region is released from the activating region before the confirmation state being expired.

2. The method of claim 1, further comprising resetting the mobile device to the standby state when the touch received in the activating region is released during the introduction state.

3. The method of claim 1, further comprising resetting the mobile device to the standby state when the touch received in the activating region is not released until the confirmation state is expired.

4. The method of claim 1, further comprising resetting the mobile device to the standby state when the touch received in the activating region is dragged away from activating region during the confirmation state.

5. The method of claim 1, further comprising resetting the mobile device to the standby state when a sudden motion of the device is detected during the introduction state.

6. The method of claim 1, further comprising resetting the mobile device to the standby state when voice of a user is detected during the introduction state.

7. The method of claim 1, further comprising:
matching the selected product to a database of purchasing record of the user;
determining whether the user has purchased the selected product before; and
reducing the introduction time duration for a period of time when the user has purchased the selected product before.

8. The method of claim 1, further comprising:
matching the selected product to a database of purchasing record of the user;
determining whether the user has purchased the selected product before; and
setting the mobile device to enter the confirmation state without entering the introduction state when the user has purchased the selected product before.

9. The method of claim 1, further comprising:
storing a lookup table of a list of age ranges and corresponding introduction time duration values;
searching an age range in which the identified user belongs to; and
setting the introduction time duration to an introduction time duration value corresponding to the searched age range in the lookup table.

10. A mobile device configured to facilitate a single touch-and-drag operation, comprising:
a touch-sensitive screen configured to display a user interface including one or more activating regions to facilitate user input and selections, to sense input touch gestures;
a touch-sensing controller connected to the touch-sensitive screen and configured to receive the touch-sensing signals from the touch-sensitive screen to generate touch data;
a display driver connected to the touch-sensitive screen and configured to drive the touch-sensitive screen to display the user interface;
a processor connected to the touch-sensing controller and the display driver, and configured to receive the touch data from the touch-sensing controller to analyze touch data for identifying a user input, execute an application process in response to the identified user input, and generate display data for the display driver to reconfigure the user interface being displayed in the touch-sensitive screen;
a memory connected to the processor and configured to store one or more touch-sensing parameters or predetermined instructions for execution of the application process; and
a communication module connected to the processor, and configured to transmit the identified user inputs to a remote processor to execute a remote application process;
wherein the processor is further configured to:
set the device to a standby state and displaying a user interface including one or more activating regions on the touch-sensitive screen;
when a touch is determined to be received in the activating region, set the mobile device to an introduction state configured to be expired in an introduction time duration;
start a first timer to count down from the introduction time and displaying timing information of the first timer on the touch-sensitive screen for indicating progress of the introduction state;
when the introduction state is expired, set the mobile device to a confirmation state when the touch received in the activating region is not released, wherein the confirmation state is configured to be expired in a confirmation time duration;
start a second timer configured to count down from the confirmation time duration;
set the mobile device to enter an execution state to execute an application process corresponding to the activating region or transmit a command to a remote server to execute a remote application process corresponding to the activating region when the touch received in the activating region is released from the activating region before the confirmation state being expired.

11. The mobile device of claim 10, wherein the processor is further configured to reset the mobile device to the standby state when the touch received in the activating region is released during the introduction state.

12. The mobile device of claim 10, wherein the processor is further configured to reset the mobile device to the standby state when the touch received in the activating region is not released until the confirmation state is expired.

13. The mobile device of claim 10, wherein the processor is further configured to reset the mobile device to the standby state when the touch received in the activating region is dragged away from activating region during the confirmation state.

14. The mobile device of claim 10, further comprising an acceleration sensing module connected to the processor and configured to measure acceleration of the mobile device and generate acceleration signals; wherein the processor is further configured to:
receive the generated acceleration signals and determine whether there is a sudden motion of the mobile device: and
reset the mobile device to the standby state when a sudden motion of the device is detected during the introduction state.

15. The mobile device of claim 10, further comprising voice receiving module connected to the processor and configured to receive voice of a user and generate voice signals; wherein the processor is further configured to
receive the generated voice signals and identify whether the voice belongs to the user of the mobile device; and
reset the mobile device to the standby state when voice of a user is detected during the introduction state.

16. The mobile device of claim 10, wherein the processor is further configured to:
match the selected product to a database of purchasing record of the user;
determine whether the user has purchased the selected product before; and
reduce the introduction time duration for a period of time when the user has purchased the selected product before.

17. The mobile device of claim 10, wherein the processor is further configured to:
match the selected product to a database of purchasing record of the user;
determine whether the user has purchased the selected product before; and
set the mobile device to enter the confirmation state without entering the introduction state when the user has purchased the selected product before.

18. The mobile device of claim 10, wherein:
the memory is further configured to store a lookup table of a list of age ranges and corresponding introduction time duration values; and the processor is further configured to:
   search an age range in which the identified user belongs to; and
   set the introduction time duration to an introduction time duration value corresponding to the searched age range in the lookup table.

* * * * *